(12) United States Patent
Cobb et al.

(10) Patent No.: US 9,749,541 B2
(45) Date of Patent: Aug. 29, 2017

(54) METHOD AND APPARATUS FOR DISPLAYING AND RECORDING IMAGES USING MULTIPLE IMAGE CAPTURING DEVICES INTEGRATED INTO A SINGLE MOBILE DEVICE

(71) Applicant: Tout, Inc., San Francisco, CA (US)

(72) Inventors: Jonathan Cobb, Piedmont, CA (US); James Martinez, San Francisco, CA (US); Jeremia Kimelman, San Francisco, CA (US); Scott Velicer, San Francisco, CA (US)

(73) Assignee: Tout Inc., San Francisco, CA (US)

( * ) Notice: Subject to any disclaimer, the term of this patent is extended or adjusted under 35 U.S.C. 154(b) by 591 days.

(21) Appl. No.: 14/254,071

(22) Filed: Apr. 16, 2014

(65) Prior Publication Data

US 2014/0307101 A1    Oct. 16, 2014

Related U.S. Application Data

(60) Provisional application No. 61/812,358, filed on Apr. 16, 2013.

(51) Int. Cl.
*H04N 21/00* (2011.01)
*H04N 5/232* (2006.01)
*H04N 5/45* (2011.01)
*H04N 9/802* (2006.01)
*H04N 9/82* (2006.01)
*H04N 21/414* (2011.01)
*H04N 21/4223* (2011.01)
*H04N 21/431* (2011.01)
*H04N 21/433* (2011.01)

(52) U.S. Cl.
CPC .......... *H04N 5/23293* (2013.01); *H04N 5/45* (2013.01); *H04N 9/802* (2013.01); *H04N 9/8227* (2013.01); *H04N 21/41407* (2013.01); *H04N 21/4223* (2013.01); *H04N 21/4316* (2013.01); *H04N 21/4334* (2013.01)

(58) Field of Classification Search
CPC ...... H04N 5/225; H04N 13/02; H04N 5/2258; H04N 13/0239; H04N 13/0242; H04N 7/18; H04N 9/47
See application file for complete search history.

(56) References Cited

U.S. PATENT DOCUMENTS

| | | | | |
|---|---|---|---|---|
| 5,444,791 A | * | 8/1995 | Kamada | G06K 9/00335 348/155 |
| 5,594,469 A | * | 1/1997 | Freeman | G05B 19/106 345/157 |
| 5,617,312 A | * | 4/1997 | Iura | G06F 3/011 345/157 |

(Continued)

*Primary Examiner* — Frank Huang

(57) ABSTRACT

A method for capturing images using a mobile device that includes a plurality of integrated image capturing devices having a plurality of different fields of view includes displaying a first image of a first field of view associated with a first one of the plurality of image capturing devices on a first region of a display of the mobile device, and displaying a second image of a second field of view associated with a second one of the plurality of image capturing devices on a second region of the display of the mobile device, wherein the first image and the second image are displayed simultaneously.

15 Claims, 6 Drawing Sheets

(56) References Cited

U.S. PATENT DOCUMENTS

| | | | | |
|---|---|---|---|---|
| 5,808,678 A * | 9/1998 | Sakaegi | H04N 5/23293 | 348/333.03 |
| 5,991,428 A * | 11/1999 | Taniguchi | G06K 9/3241 | 348/155 |
| 6,191,773 B1 * | 2/2001 | Maruno | G06F 3/017 | 345/156 |
| 6,498,628 B2 * | 12/2002 | Iwamura | G08C 23/00 | 345/157 |
| 6,501,515 B1 * | 12/2002 | Iwamura | G08C 23/00 | 345/157 |
| 7,639,233 B2 * | 12/2009 | Marks | G06F 3/0304 | 345/156 |
| 7,828,659 B2 * | 11/2010 | Wada | A63F 13/00 | 345/156 |
| 8,035,624 B2 * | 10/2011 | Bell | G06F 3/011 | 345/175 |
| 8,115,877 B2 * | 2/2012 | Blatchley | G06F 1/1601 | 345/158 |
| 8,144,121 B2 * | 3/2012 | Kitaura | G06F 3/0304 | 178/18.01 |
| 8,199,108 B2 * | 6/2012 | Bell | G06F 3/011 | 345/156 |
| 8,203,601 B2 * | 6/2012 | Kida | G06F 3/017 | 348/135 |
| 8,228,305 B2 * | 7/2012 | Pryor | G06F 3/011 | 178/18.01 |
| 8,230,367 B2 * | 7/2012 | Bell | G06F 3/011 | 382/154 |
| 8,253,746 B2 * | 8/2012 | Geisner | G06F 3/011 | 345/474 |
| 8,300,042 B2 * | 10/2012 | Bell | G06F 3/011 | 345/156 |
| 8,340,432 B2 * | 12/2012 | Mathe | G06K 9/00201 | 382/190 |
| 8,368,819 B2 * | 2/2013 | Lee | H04N 21/42204 | 348/734 |
| 8,379,101 B2 * | 2/2013 | Mathe | G06K 9/00342 | 348/222.1 |
| 8,418,085 B2 * | 4/2013 | Snook | G06K 9/00342 | 715/707 |
| 9,332,167 B1 * | 5/2016 | Pance | H04N 5/2258 | |
| 2007/0279485 A1 * | 12/2007 | Ohba | G06F 3/012 | 348/41 |
| 2008/0088588 A1 * | 4/2008 | Kitaura | G06F 3/0304 | 345/158 |
| 2011/0138550 A1 * | 6/2011 | Park | A46B 5/0095 | 15/21.1 |
| 2013/0050427 A1 * | 2/2013 | Chou | H04N 13/0022 | 348/46 |
| 2014/0068439 A1 * | 3/2014 | Lacaze | G06F 3/04855 | 715/720 |
| 2014/0078389 A1 * | 3/2014 | Merz | H04N 5/2252 | 348/375 |

* cited by examiner

METHOD AND APPARATUS FOR DISPLAYING AND RECORDING IMAGES USING MULTIPLE IMAGE CAPTURING DEVICES INTEGRATED INTO A SINGLE MOBILE DEVICE

CROSS REFERENCE TO RELATED APPLICATIONS

This application claims the benefit of U.S. Provisional Patent Application Ser. No. 61/812,358, filed Apr. 16, 2013, which is herein incorporated by reference in its entirety.

FIELD OF THE INVENTION

The present invention generally relates to the field of media creation, and more specifically relates to the creation of media using mobile devices with multiple built-in image capturing devices.

BACKGROUND

In recent years, it has become increasingly common for mobile devices such as mobile phones, mobile gaming devices, tablet computers, and the like to include built-in cameras. For instance, it has been reported that a majority of the mobile phones currently in use include cameras, and that more photos are now taken using mobile phones than using traditional cameras.

Even more recently, mobile devices have been introduced that include multiple built-in cameras. For instance, many mobile phones now include separate front-facing and rear-facing cameras. Typically, images captured by only one of these cameras can be viewed in real time. That is, a user may choose to view in real time the images captured by the front facing camera or by the rear facing camera, but cannot view real-time images captured by both of the cameras at the same time.

SUMMARY OF THE INVENTION

A method for capturing images using a mobile device that includes a plurality of integrated image capturing devices having a plurality of different fields of view includes displaying a first image of a first field of view associated with a first one of the plurality of image capturing devices on a first region of a display of the mobile device, and displaying a second image of a second field of view associated with a second one of the plurality of image capturing devices on a second region of the display of the mobile device, wherein the first image and the second image are displayed simultaneously.

A second method for capturing images using a mobile device that includes a plurality of integrated image capturing devices having a plurality of different fields of view includes recording a first image of a first field of view associated with a first one of the plurality of image capturing devices, wherein the recording stores the first image at least temporarily in a memory of the mobile device, and displaying a second image of a second field of view associated with a second one of the plurality of image capturing devices on a display of the mobile device, wherein the recording and the displaying are performed simultaneously.

A third method for capturing images using a mobile device that includes a plurality of integrated image capturing devices having a plurality of different fields of view includes recording a first image of a first field of view associated with a first one of the plurality of image capturing devices, wherein the recording the first image stores the first image at least temporarily as a stream in a memory of the mobile device, and recording a second image of a second field of view associated with a second one of the plurality of image capturing devices, wherein the recording the second image stores the second image in the stream.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for displaying and recording images using multiple image capturing devices integrated into a single mobile device. Embodiments of the invention allow a user of a mobile device having multiple integrated image capturing devices to view and/or record the fields of view of multiple image capturing devices simultaneously, as well as to switch between fields of view while viewing or recording.

Figure 1B:
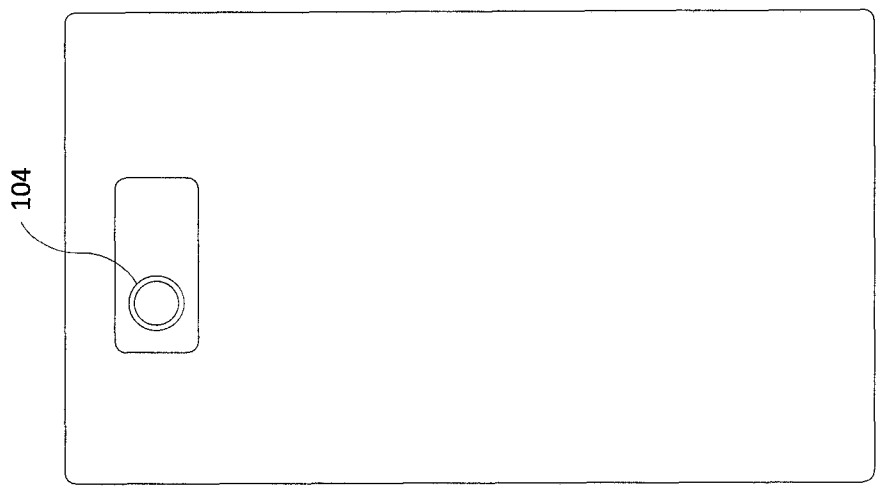
FIGS. 1A-1B are front and back views, respectively, of an exemplary mobile phone having multiple integrated image capturing devices.
Figure 1A:
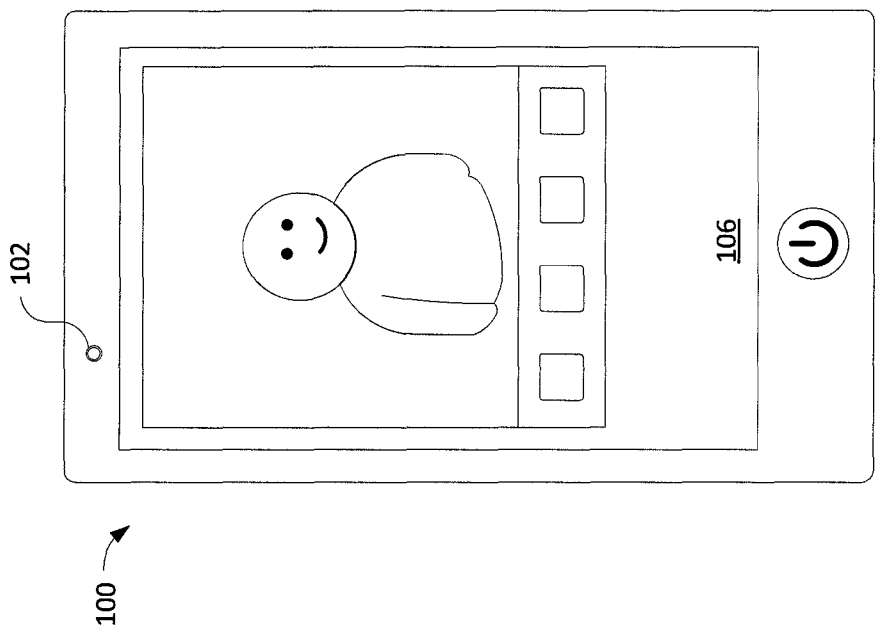

FIGS. 1A-1B are front and back views, respectively, of an exemplary mobile phone 100 having multiple integrated image capturing devices. Although the present invention is described within the context of a mobile phone, it will be appreciated that embodiments of the invention are equally applicable to other types of mobile devices having integrated image capturing devices (e.g., mobile gaming devices, tablet computers, or the like).

As illustrated, the mobile phone 100 includes multiple integrated image capturing devices. In the particular example illustrated in FIGS. 1A-1B, the mobile phone 100 includes one "front facing" camera 102 (i.e., having a field of view that is generally orthogonal to the front of the mobile phone 100) and one "rear facing" camera 104 (i.e., having a field of view that is generally orthogonal to the back of the mobile phone 100). Each of the front facing camera 102 and the rear facing camera 104 may be capable of capturing still and/or video images. Although the mobile phone 100 is illustrated as including two integrated image capturing devices having opposite fields of view, it will be appreciated embodiments of the present invention are equally applicable to mobile devices having any number of integrated image capturing devices that are capable of capturing images in different fields of view.

As illustrated in FIG. 1A, the display 106 of the mobile phone 100 can be used to display images (still and/or video) captured by the cameras 102 and 104. Typically, images captured by only one of the cameras 102 or 104 are viewable in real time. That is, a user may choose to view in real time the images captured by the front facing camera 102 or by the rear facing camera 104, but not by both at the same time.

Figure 2:
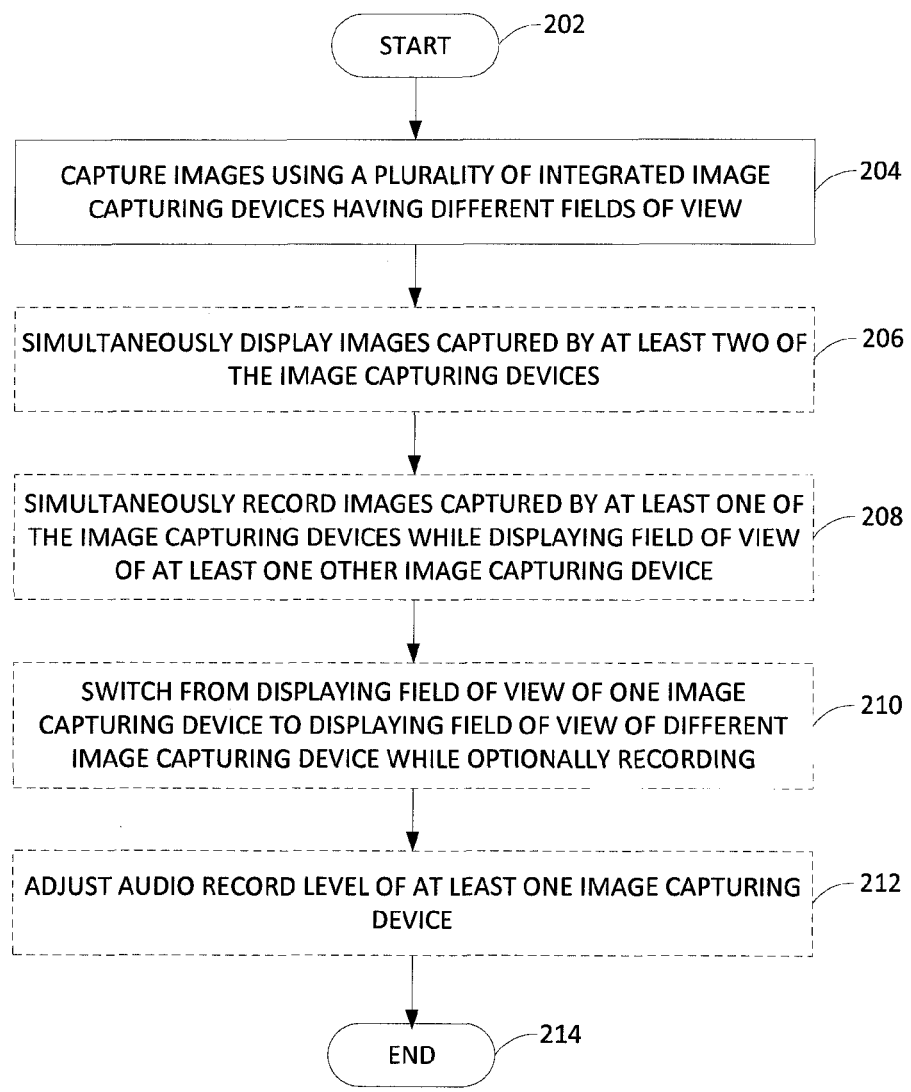
FIG. 2 is a flow diagram illustrating one embodiment of a method for recording images using multiple image capturing devices integrated into a single mobile device, according to the present invention.

FIG. 2 is a flow diagram illustrating one embodiment of a method 200 for recording images using a plurality of image capturing devices integrated into a single mobile device (such as the mobile phone 100 illustrated in FIGS. 1A-1B), according to the present invention. The method 200 may be executed, for example, by various components (e.g., processor, memory, image capturing devices, and/or other input/output devices) of the mobile device. Alternatively, the method 200 may be executed by a remote processor in communication with the mobile device.

The method 200 begins in step 202. In step 204, the plurality of image capturing devices capture images of different fields of view. As discussed above, the captured images may be video images, still images, or a combination of both video images and still images. For instance, step 204 may include capturing images using both a front facing camera and a rear facing camera of a mobile phone. In one embodiment, the "capturing" of an image does not necessarily imply that the image is being recorded or stored by the mobile device; "capturing" may simply involve making the field of view visible on the display until the user provides some command that causes the images to be recorded.

Figure 3B:
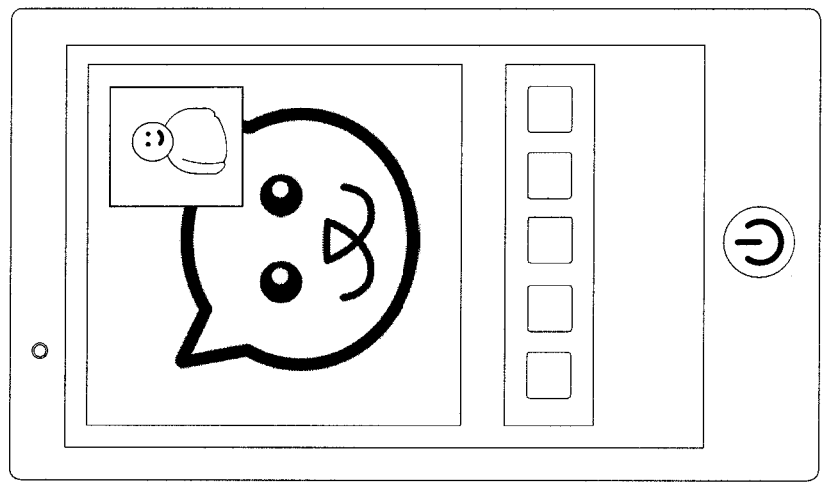
FIGS. 3A-3B are schematic diagrams illustrating two potential arrangements for simultaneous image display in accordance with the method illustrated in FIG. 2.
Figure 3A:
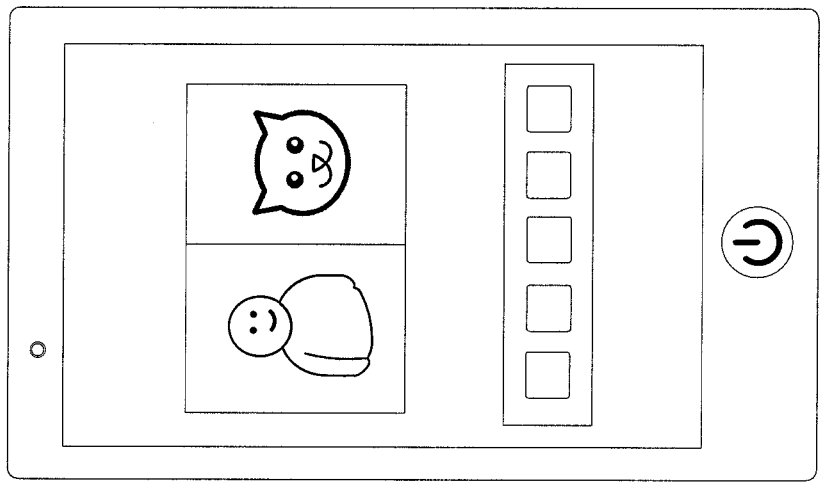

In optional step 206 (illustrated in phantom), the display of the mobile device simultaneously displays the images captured by at least two of the image capturing devices. FIGS. 3A-3B are schematic diagrams illustrating two potential arrangements for simultaneous image display in accordance with step 206. For instance, the display may simultaneously display images captured by both a front facing camera and a rear facing camera of a mobile phone in different regions of the display. The multiple images may be displayed side-by-side (e.g., in separate frames, of equal size or of different sizes, as illustrated in FIG. 3A) or as a picture-in-a-picture (e.g., in superimposed or overlapping frames of potentially different sizes, as illustrated in FIG. 3B). The user may select which images are displayed in which regions of the display (e.g., which image is the larger image in the case of a picture-in-a-picture display). In one embodiment, the images are displayed in substantially real time (i.e., as they are captured, accounting for any processing latency). In one embodiment, the image capturing devices whose images are displayed are selected by a user of the mobile device.

Figure 4:
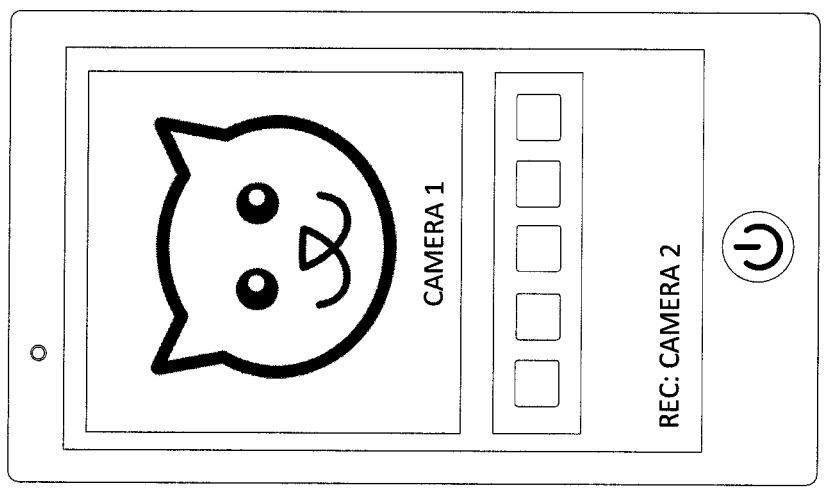
FIG. 4 is a schematic diagram illustrating one embodiment of a display that displays one field of view while recording a different field of view.

In optional step 208 (illustrated in phantom), the mobile device records the images captured by at least one of the image capturing devices, while displaying an image of the field of view of at least one other image capturing device. FIG. 4 is a schematic diagram illustrating one embodiment of a display that displays one field of view while recording a different field of view. For example, the images captured by the front facing camera of a mobile phone may be recorded (e.g., stored at least temporarily in a memory of the mobile phone or in a remote location), while the display of the mobile phone simultaneously displays an image of the field of view of the rear facing camera (but does not record images captured by the rear facing camera). In one embodiment, the user of the mobile device selects which image capturing device's field of view will be recorded and which will simply be displayed without being recorded. In one embodiment, the images being recorded are also displayed on the display, although they do not necessarily have to be displayed to be recorded.

Figure 5:
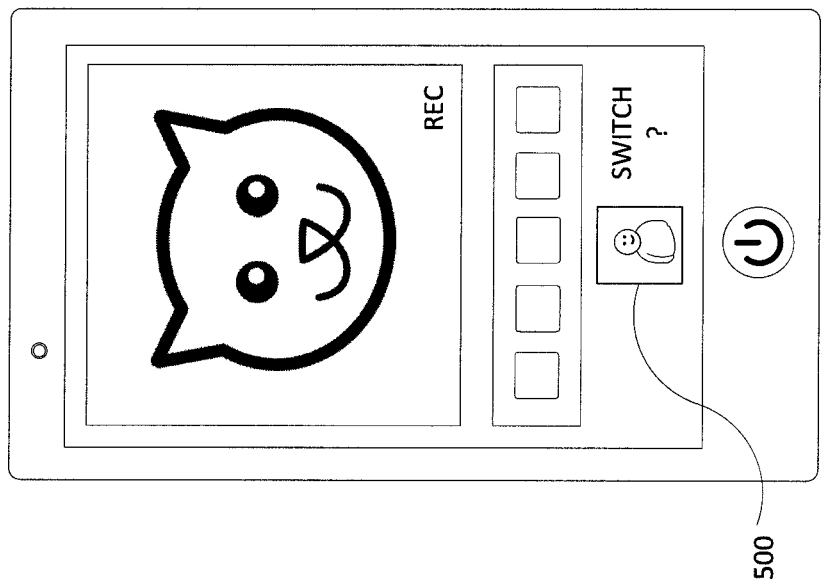
FIG. 5 is a schematic diagram illustrating one embodiment of a display that allows on-demand switching between different fields of view.

In step optional 210 (illustrated in phantom), the display switches from displaying an image of the field of view of one of the image capturing devices to displaying an image of the field of view of another, different one of the image capturing devices. FIG. 5 is a schematic diagram illustrating one embodiment of a display that allows on-demand switching between different fields of view. For example, the display may switch from displaying an image of the field of view of the front facing camera to displaying an image of the field of view of the rear facing camera. In one embodiment, the switch is made in response to a user command, such as the press of a button. In a further embodiment, a button displayed on the display (e.g., a button of a touch screen display) to enable switching between fields of view displays an image of the current field of view of the image capturing device to which the display may switch. For example, if the main display is currently displaying an image of the field of view of a front facing camera, the button may display a thumbnail image of the field of view of a rear facing camera (e.g., as in the case of the button 500 of FIG. 5). In one embodiment, one or both of the fields of view between which the display may switch are recorded.

In a further embodiment, the mobile device may record a single stream of images as the display switches an infinite number of times (e.g., in response to user commands) between the fields of view of multiple image capturing devices. For example, a single, continuous video stream recorded by the device may switch back and forth between the fields of view of a front facing camera and a rear facing camera. In this case, the mobile device may cease recording a first field of view upon receiving a command to switch to (and record) a second field of view.

Figure 6:
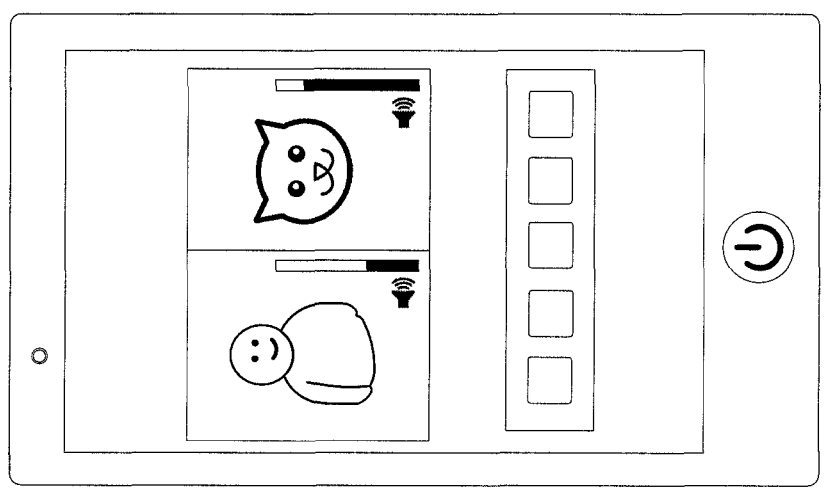
FIG. 6 is a schematic diagram illustrating one embodiment of a display that allows separate adjustment of the audio record levels of different image capturing devices.

In optional step 212, the mobile device adjusts the audio record level of at least one of the image capturing devices. FIG. 6 is a schematic diagram illustrating one embodiment of a display that allows separate adjustment of the audio record levels of different image capturing devices. In one embodiment, the adjustment is made in response to a user command. In one embodiment, the audio record levels of the different image capturing devices are separately adjustable. For example, the volume of the audio recorded by a front facing camera may be higher than the volume of audio recorded by a rear facing camera.

The method 200 ends in step 214.

Several of the steps of the method 200 are described as being optional. In other words, the method 200 may perform all or only some of the operations described above in any given order. In this way, the method 200 is able to exploit the capabilities of the multiple integrated image capturing devices with maximum flexibility.

Figure 7:
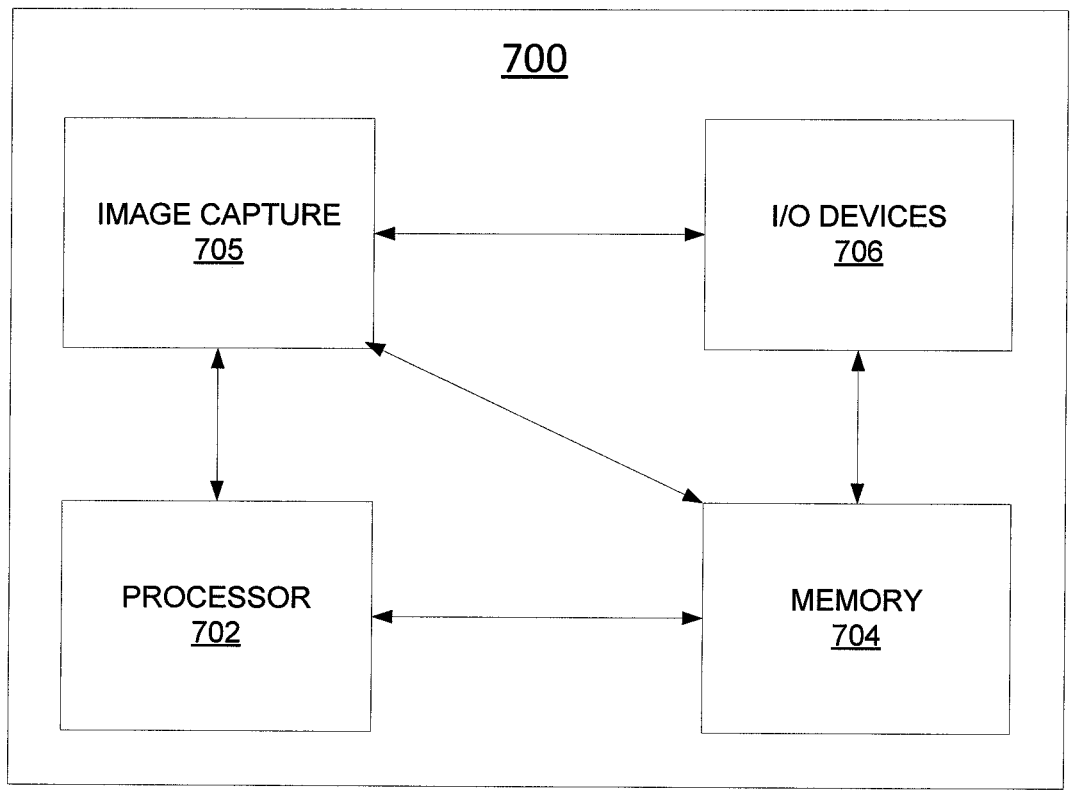
FIG. 7 is a high level block diagram of the present invention implemented using a general purpose computing device.

FIG. 7 is a high level block diagram of the present invention implemented using a general purpose computing device 700. The general purpose computing device 100 may comprise a portion of the mobile device 100 illustrated in FIGS. 1A-1B. It should be understood that embodiments of the invention can be implemented as a physical device or subsystem that is coupled to a processor through a communication channel. Therefore, in one embodiment, a general purpose computing device 700 comprises a processor 702, a memory 704, an image capturing module 705, and various input/output (I/O) devices 706 such as a display, a keyboard, a mouse, a modem, a microphone, speakers, a touch screen, an adaptable I/O device, a network interface card, a camera, and the like. In one embodiment, at least one I/O device is a storage device (e.g., a disk drive, an optical disk drive, a floppy disk drive).

Alternatively, embodiments of the present invention (e.g., image capturing module 705) can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the image capturing module 705 for recording images using multiple image capturing devices integrated into a single mobile device described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for capturing images using a mobile device that includes a plurality of integrated image capturing devices having a plurality of different fields of view, the method comprising:
   recording an image of a first field of view associated with a first image capturing device of the plurality of integrated image capturing devices and storing the image of the first field of view in a single image stream;
   displaying the image of the first field of view on a first region of a display of the mobile device during the recording and the storing;
   displaying an image of a second field of view associated with a second image capturing device of the plurality of integrated image capturing devices on a second region of the display of the mobile device during the recording and the storing, wherein the first field of view and the second field of view face in opposite directions, wherein the image of the first field of view and the image of the second field of view are displayed simultaneously;
   adjusting a first audio record level associated with the first image capturing device, independently of a second audio record level associated with the second image capturing device, so that the first audio record level is different from the second audio record level;
   ceasing the recording and the storing of the image of the first field of view; and
   recording the image of the second field of view and storing the image of the second field of view into the single image stream so that the single image stream switches from the first field of view to the second field of view.

2. The method of claim 1, wherein at least one of the image of the first field of view or the image of the second field of view is a still image.

3. The method of claim 1, wherein at least one of the image of the first field of view or the image of the second field of view is a video image.

4. The method of claim 1, wherein the first region of the display and the second region of the display are positioned side-by-side on the display.

5. The method of claim 1, wherein the first region of the display overlaps the second region of the display.

6. The method of claim 1, wherein the displaying the image of the first field of view and the displaying the image of the second field of view are performed in real time as the image of the first field of view and the image of the second field of view are captured.

7. The method of claim 1, wherein the single image stream is stored in a memory of the mobile device.

8. The method of claim 1, wherein the single image stream is stored in a remote memory separate from the mobile device.

9. The method of claim 1, wherein at least one of the recording the image of the first field of view and the recording the image of the second field of view is performed in response to a command from a user of the mobile device.

10. The method of claim 1, wherein the recording the image of the first field of view is performed during the displaying the image of the second field of view, but without recording the image of the second field of view.

11. The method of claim 1, wherein the ceasing and the recording the image of the second field of view are performed in response to a command from a user of the mobile device.

12. The method of claim 1, wherein the mobile device is a mobile phone.

13. The method of claim 12, wherein the first image capturing device is a front-facing camera of the mobile phone, and the second image capturing device is a rear-facing camera of the mobile phone.

14. The method of claim 1, wherein the mobile device is a tablet computer.

15. A method for capturing images using a mobile device that includes a plurality of integrated image capturing devices having a plurality of different fields of view, the method comprising:
   recording an image of a first field of view associated with a first image capturing device of the plurality of integrated image capturing devices, wherein the recording the image of the first field of view stores the image of the first field of view at least temporarily in a single image stream in a memory of the mobile device;
   recording an image of a second field of view associated with a second image capturing device of the plurality of integrated image capturing devices, wherein the first field of view and the second field of view face in opposite directions, wherein the recording the image of the second field of view stores the image of the second field of view in the single image stream so that the single image stream switches from the first field of view to the second field of view; and
   adjusting a first audio record level associated with the first image capturing device, independently of a second audio record level associated with the second image capturing device, so that the first audio record level is different from the second audio record level.

\* \* \* \* \*